United States Patent [19]

Robinson

[11] 3,794,820

[45] Feb. 26, 1974

[54] BINARY MULTIPLIER CIRCUIT

[75] Inventor: John L. Robinson, Wenonah, N.J.

[73] Assignee: Philco-Ford Corporation, Blue Bell, Pa.

[22] Filed: Oct. 16, 1972

[21] Appl. No.: 297,955

[52] U.S. Cl. .................................................. 235/164
[51] Int. Cl. .................................................. G06f 7/54
[58] Field of Search .................................................. 235/164

[56] References Cited

UNITED STATES PATENTS

| | | | |
|---|---|---|---|
| 3,469,086 | 9/1969 | Matthews | 235/164 |
| 3,524,977 | 8/1970 | Wang | 235/164 |
| 3,670,956 | 6/1972 | Calhoun | 235/164 |

*Primary Examiner*—Malcolm A. Morrison
*Assistant Examiner*—David H. Malzahn
*Attorney, Agent, or Firm*—Robert D. Sanborn; Herbert Epstein

[57] ABSTRACT

A fast binary multiplier in the form of a matrix of partial product generators and addition circuits wherein the number of columns of the matrix corresponds to the largest number of digits in the multiplicand and the number of rows in the matrix corresponds to the largest number of digits of the multiplier for which the multiplier is designed. The multiplier is constructed much like a parallel multiplier but operates like a serial multiplier.

9 Claims, 10 Drawing Figures

BINARY MULTIPLIER CIRCUIT

BACKGROUND OF THE INVENTION

Binary multiplication is discussed in detail in Chapter 5 of the textbook "Arithmetic Operations in Digital Computers" by R. K. Richards. The arithmetic unit of a binary computer usually includes a serial or parallel addition circuit. Subtraction, multiplication and division may be performed by the addition circuit using various algorithms. In some special purpose processors a hard wired multiplier is included. Such multipliers generally have been two main types, the parallel multiplier and the serial multiplier. In the parallel multiplier there is a multiplier circuit for each of the partial products generated by the multiplication of the digits of the multiplicand by the digits of the multiplier. In the serial multiplier there is only one multiplier circuit and the digits are serially processed in this multiplier circuit in separate time intervals. The parallel multiplier is much faster, but requires more complicated circuitry. The serial multiplier is cheaper to manufacture, but takes a longer time to perform the multiplication. A second advantage of serial multipliers is that carries, which propagate from the addition of partial products, are more easily handled than in parallel multiplication. In serial multiplication the carries are generated one at a time and can be propagated in a simple manner. In parallel multiplication many carries are generated at once and circuitry must be provided to allow the carries to ripple through the processor. Were it not for the carry propagation problem, a parallel multiplier could form the product in a number of time intervals or clock pulse intervals equal to the number of bits in the multiplier. Because of the complication of the carry propagation many additional clock pulse intervals must elapse before a final product is formed.

SUMMARY OF THE INVENTION

It is an object of the present invention to provide a binary multiplier circuit which will multiply many sets of numbers in rapid succession.

It is another object to provide a binary multiplier circuit which will produce successive products at intervals of single clock pulse periods.

It is still a further object to provide a binary multiplier circuit which will multiply numbers whose digits are skewed in time and produce products whose digits are skewed in time.

These and other objects are achieved by constructing a binary multiplier having a partial product generator for each partial product to be formed. The partial product generators are connected in the form of a matrix of partial product generators which are clocked shift register sections. The multiplier and multiplicand are not entered in parallel or series fashion but are entered in skewed fashion, that is: the lowest order digit is accepted in a first clock pulse interval; the next higher order digit is accepted in the next clock pulse interval at a different terminal than the first digit; and so on until all digits of a number have been accepted in as many clock pulse intervals at as many terminals. The partial products are not formed simultaneously, but are formed in succeeding clock pulse intervals in each row of partial product generators of the matrix. The product formation in each succeeding row of partial product generators begins before the product formation in the preceding row has been finished. The carries generated by the addition of the partial products therefore ripple through the addition circuit in a straightforward manner. The digits in the product are formed in succeeding clock pulse intervals, and the entire multiplier is arranged so that new numbers to be multiplied can be entered into the multiplier on succeeding clock pulse intervals. The result is that a product appears out of the multiplier every succeeding clock pulse interval. The ultimate effect when using the multiplier to multiply long lists of numbers is that products are formed every clock pulse interval.

As an illustration, in the multiplication of a three bit number by another three bit number, the product may have five bits. A serial multiplier may require 16 clock pulse intervals to form the complete product. In a parallel multiplier, due to the carry ripple, the final product may be formed in six clock pulse intervals.

When employing the binary multiplier of the subject invention, the final digit of the product appears eight clock pulse intervals after the first digits of the multiplier and multiplicand were entered. However, the first digits of a second set of numbers can be entered into the multiplier one clock pulse interval after the first digits of the first set of numbers have been entered, and the last digit of the product of the second set of numbers appears one clock pulse interval after the last digit of the product of the first set of numbers appeared. Thus the subject multiplier is somewhat slower than a parallel multiplier when used for multiplying only two numbers together, but it is extremely fast when multiplying many consecutive sets of numbers together.

Shift register sections are incorporated in the multiplier to step the digits along so that they are available when needed. The digits of the multiplicand are accepted in the columns of partial product generators such that each digit is passed to succeeding partial product generators in a given column on succeeding clock intervals. Each digit of the multiplier is propagated along a particular row of partial product generators, passing from one partial product generator to another in the same row every succeeding clock pulse interval. The partial product corresponding to the lowest order digit of the multiplicand is formed in any row except the first in the same time interval as the partial product corresponding to the multiplicand digit of second higher order in the preceding row. Each partial product is passed to its respective addition circuit one clock pulse interval later. Each addition circuit accepts a carry (either "one" or "zero") from the preceding addition circuit in the same row one clock pulse interval later. The sum output from each addition circuit is passed to the addition circuit of the succeeding row and preceding column one clock pulse interval later. The digits of the multiplicand and the multiplier therefore are said to be entered into the multiplier in skewed fashion beginning with the lowest order. Digits of the products appear at the output in skewed order beginning with the lowest order. Of course, with suitable shift register stages the skewed property of the operands can be introduced or removed.

DETAILED DESCRIPTION OF THE INVENTION

Figure 1A:
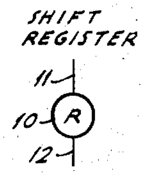
FIGS. 1(*a*) to 1(*d*) illustrate four symbols which represent four basic building blocks, i.e., a shift register stage, an inverting shift register stage, a product generator and an addition circuit, respectively, used in the construction of the multiplier unit.
Figure 1B:
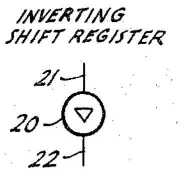
Figure 1C:
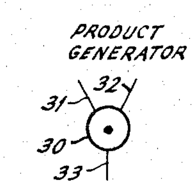
Figure 1D:
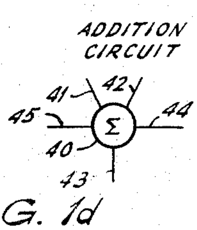

It should be kept in mind that in the description which follows all units operate synchronously, that is, they operate under the influence of clock pulses received from a master clock pulse generator. This procedure is well known to those versed in the art. In order to simplify the drawings the clock pulse connections have been omitted in many of the drawings. For this same reason the power supply and its connections have also been omitted.

Referring now to FIGS. 1(*a*) to 1(*d*), four symbols are illustrated showing the four major building blocks used in the construction of the complete multiplier. The first, shown in FIGS. 1(*a*), is a standard shift register section 10, having an input lead 11 and an output lead 12. This unit accepts a level on its input lead 11 during one clock pulse and stores it on its output lead 12 for a clock period. The symbol illustrated in FIG. 1(*b*) at 20 is a conventional inverter shift register stage having an input lead 21 and an output lead 22. During a clock pulse an information pulse is accepted on input lead 21, and the inverse of that information is transferred to the output lead 22. The symbol illustrated at 30 in FIG. 1(*c*) represents a partial product generator. During a clock pulse interval information is accepted from a first digit source on an input lead 31 and from a second digit source on an input lead 32. The product of the two digits is stored in the unit and is available on an output lead 33. The symbol illustrated at 40 in FIG. 1(*d*), represents an addition circuit having an input lead 41, an input lead 42, and an output lead 43. Addition circuit 40 also comprises a carry input lead 44, and a carry output lead 45. This device accepts an information digit on line 41, a second information digit on line 42, and a carry digit from a previous adder on line 44. During a clock pulse, addition circuit 40 produces a sum digit which is available on line 43 and a carry digit which is available on line 45.

Figure 2:
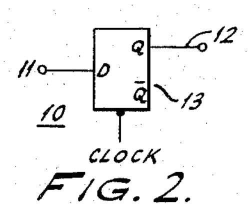
FIG. 2 is a diagrammatic representation of a commercially available D flip-flop used as one stage of a shift register unit.

Referring now to FIGS. 2 through FIG. 5, we find the logic circuits showing how the units symbolized in FIGS. 1(*a*) to 1(*d*) are constructed from elements readily available on the market. These commercially available items are identified at the end of the description of FIGS. 2 through 5. FIG. 2 shows how the standard shift register illustrated at 10 in FIG. 1 is constructed from an edge triggered flip-flop which is also known as a D flip-flop. Input lead 11 is connected to the D input, and output lead 12 is connected to the Q output. All flip-flops in FIG. 2 through FIG. 5 show a clock input. Whenever a clock pulse is applied to the line marked clock, whatever information is on the input lines is processed and the result in transferred to the output lines and held there until the next clock pulse is applied.

Figure 3:
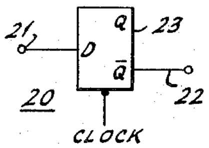
FIG. 3 is a diagrammatic representation of a commercially available D flip-flop used as one stage of an inverting shift register unit.
Figure 4:
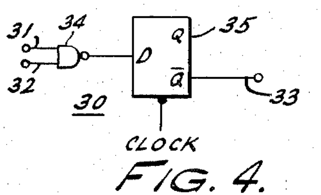
FIG. 4 shows a logic diagram of a partial product generator.

FIG. 3 shows the logic circuit for the inverting register 20 of FIG. 1. The same type flip-flop is used as in the shift register 10 (see FIG. 2) except that the output $\underline{22}$ is connected to the inverting output which is labeled $\overline{Q}$. The input lead 21 is connected to the D input as is lead 11 in FIG. 2. FIG. 4 illustrates one form of logic circuit acceptable for the product generator shown at 30 of FIG. 1. The logic circuit comprises a NAND gate 34 and a D flip-flop 35. The two input leads 31 and 32 are respectively connected to the two inputs of the NAND gate, and the output of the NAND gate 34 is fed to the D input of the flip-flop 35. Since the NAND gate 34 inverts the output, i.e., a one on each input produces a zero at its output, it must be reinverted to provide the correct polarity. This reinverted output may be obtained at the $\overline{Q}$ output, to which output lead 33 is connected.

Figure 5:
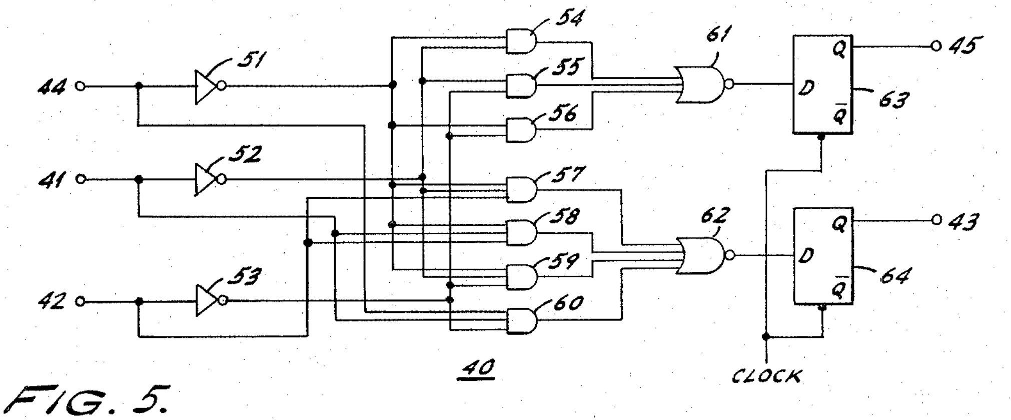
FIG. 5 shows the logic and circuit diagram of an addition unit of the type shown symbolically in FIG. 1(*d*).

FIG. 5 shows the logic diagram for the addition circuit 40 of FIG. 1(*d*). This circuit comprises the three inverters 51, 52 and 53; three two-input NAND gates 54, 55 and 56; four three-input NAND gates 57, 58, 59 and 60; a three-input NOR gate 61; a four-input NOR gate 62; and two D flip-flops 63 and 64. This circuit, which accepts carries from a previous adder on line 44 and two addition inputs on terminals 41 and 42, produces a sum output on terminal 43 and a carry output on terminal 45.

By way of example only, the bistable latch or D flip-flop denoted by 13 in FIG. 2, 23 in FIG. 3, 35 in FIG. 4, and 63 and 64 in FIG. 5 may comprise one section of the Dual D-type Edge-Triggered Flip-Flop number SN7474N manufactured by Texas Instruments, Inc. The NAND gate denoted by 34 in of FIG. 4 may be one section of Quadruple 2-Input NAND Gate number SN5400N, and the addition circuit denoted by 51 through 62 in FIG. 5 may be one section of Four-Bit Binary Full-Adder number SN5483N, also manufactured by Texas Instruments, Inc.

Although the above products are TTL integrated circuits, it will be recognized that other forms of circuits, including DTL, RTL, and MOS integrated circuits, as well as discrete component transistor or tube circuits can be used.

Figure 6:
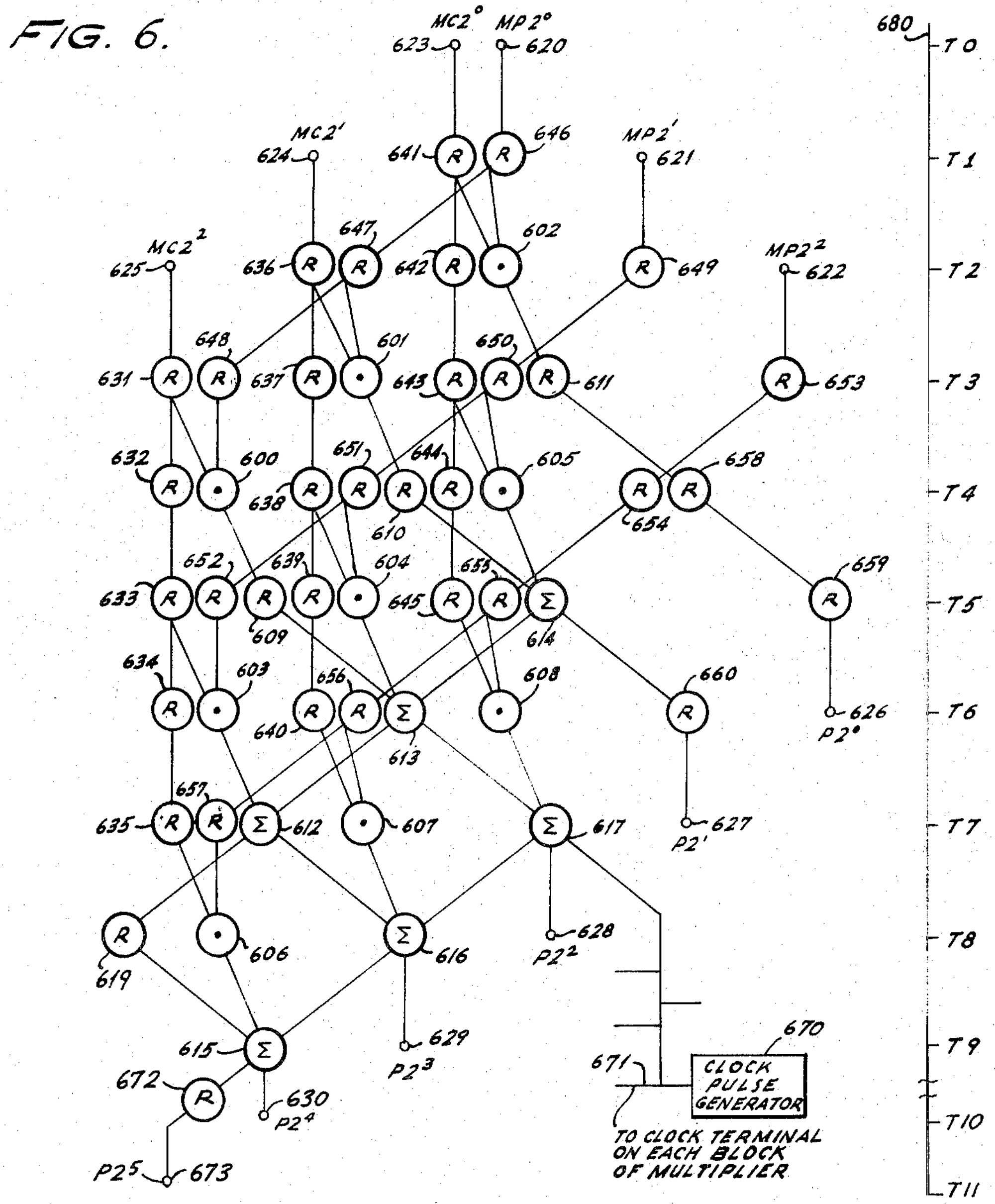
FIG. 6 shows a complete multiplier unit using the building blocks of FIGS. 1(*a*) to 1(*d*).

FIG. 6 is a diagrammatic representation of a complete multiplier for multiplying two three-digit numbers and forming a five-digit product therefrom. The multiplier is made up of the blocks illustrated in FIG. 1. The multiplier is comprised of a matrix of partial product generators 600, 601, 602, 603, 604, 605, 606, 607 and 608. There is a matrix of addition circuits 612, 613, 614, 615, 616 and 617 corresponding to all partial product generators but the first row.

Two sets of input terminals are provided. Terminals 620, 621 and 622 at the top right in FIG. 6 are provided for the digits of the multiplier, with the lowest order digit $MP2^0$ applied to terminal 620 and the highest order digit $MP2^2$ applied to terminal 622. Terminals 623, 624 and 625 at the top left in FIG. 6 are provided for the digits of the multiplicand, with the lowest order digit $MC2^0$ applied to terminal 623 and the highest order digit $MC2^2$ applied to terminal 625. In addition, a set of output terminals 626, 627, 628, 629 and 630 at the lower right in FIG. 6 are provided for delivering the digits of the products. The lowest order digit $P2^0$ appears at terminal 626, and the highest order digit $P2^4$ appears at terminal 630. A set of shift register sections 631, 632, 633, 634 and 635 at the left in FIG. 6 are provided for storage and timed delivery of the highest order digit $MC2^2$ of the multiplicand. A set of shift register sections 636, 637, 638, 639 and 640 to the right of the first group are provided for the middle digit $MC2^1$ of the multiplicand, and a set of shift registers sections 641, 642, 643, 644, and 645 still further to the right are provided for the lowest order digit $MC2^0$ of the multiplicand. A set of shift registers sections 646, 647 and 648 at the top left in FIG. 6 are provided for the lowest order digit $MP2^0$ of the multiplier. Shift register sections 649, 650, 651 and 652 are provided for the middle order digit $MP2^1$ of the multiplier and shift register sections 653, 654, 655, 656 and 657 are provided for the highest order digit $MP2^2$ of the multiplier. A set of shift register sections 609, 610 and 611 is provided to hold the first row of partial products until the second row of partial products is ready for the addition circuits. A shift register section 619 is provided for transferring carries from addition circuit 612 to addition circuit 615. Three extra shift register sections 658, 659 and 660 at the lower right in FIG. 6 are provided for balancing the skew of the product, as will be explained later.

The lowest order partial product is generated in partial product generator 602 at top center in FIG. 6 using inputs from shift register sections 641 and 646 containing the lowest orderd digits of the multiplicand and multiplier. This partial product is formed in partial product generator 602 during one clock pulse interval and then transferred to shift register section 611 during a succeeding clock pulse interval. Similarly, partial product generator 601 receives inputs from shift register sections 636 and 647 and transfers its outputs to shift register section 610. Partial product generator 600 receives inputs from shift register sections 631 and 648 and transfers its output to shift register section 609. Similarly, partial product generators 605, 604, 603, 608, 607 and 606 have their inputs connected to shift register sections 650, 643, 651, 638, 652 and 633 and shift register sections 655, 645, 656, 640, 657 and 635; but their outputs are connected to addition circuits 614, 613, 612, 617, 616 and 615, respectively. The partial product from the shift register section 611 is fed to shift register section 658.

Similarly, shift register section 610, which receives an input from partial product generator 601, passes it to addition circuit 614, and shift register section 609 receives an input from partial product generator 600 and passes it to addition circuit 613.

Unlike the addition circuit in FIG. 1(*d*) and FIG. 5, certain of the addition circuits do not have a carry out and a carry in. Addition circuits 614 and 617 do not have a carry input connector. The only addition circuits which complete connections including two inputs, a carry input connection, a carry output connection and a sum output connection are addition circuits 613 and 616. Adder 615 has two carry inputs, connected respectively to the output of shift register 619 and the carry output of adder 616, and an additional input for receiving the partial product generated by partial product generator 606. Adder 615 also has a sum output connected to terminal 630 and, as discussed more fully hereinafter, also may have a carry output connected to a terminal 673 via a shift register section 672. Those addition circuits in which all the input or output terminals are not used may have those terminals which are not used connected to ground to prevent spurious signals from creating faulty operations. Alternatively, the circuit of FIG. 5 may be suitably modified to eliminate such input connections.

Attention is particularly directed toward the shift register sections 646, 641, 647, 636, 631, 650, 643, 651, 638, 633, 655 and 656 which have to output leads connected to the single output terminal. This procedure is well known in the art of integrated circuits and is known as fan-out, particularly a fanout of two.

A clock generator 670 is shown with an output 671 connected to addition circuit 617. There are connections, not shown for simplicity, from the clock generator output to all of the other blocks of the multiplier. For the proper connection terminals, reference should be made to the terminals labelled clock in FIG. 2 through FIG. 5.

Proceeding now to the operation of the circuit, assume for the moment that a set of input numbers is continuously available at the input terminals until all digits have been accepted by the shift register sections 641, 636, 631, 646, 649 and 653. Attention is called to the time line 680 along the right hand portion of the drawing. The drawing is so arranged that in any one time interval all those blocks lying in a horizontal line simultaneously receive information from blocks lying in the horizontal line immediately above. Thus, at time TO, the lowest order digits of the multiplier and multiplicand are applied respectively to terminals 620 and 623. At T1, the second highest digit of the multiplier and multiplicand are applied to terminals 621 and 624. At the same time the lowest order digit of the multiplier is transferred into shift register section 646, and the lowest order digit of the multiplicand is transferred into shift register section 641.

At time T2, the highest order digits of the multiplier and multiplicand are applied to terminals 622 and 625. The medium order digits of the multiplier and multiplicand are transferred to shift register sections 649 and 636. The lowest order digit of the multiplier is transferred to shift register section 647 and product generator 602, and the lowest order digit of the multiplicand is transferred to shift register section 642 and product generator 602. The partial product formed by multiplying the digits appearing in shift register sections 641 and 646 is formed in the partial product generator 602.

At time T3, the digits of the multiplier beginning with the lowest order are transferred to shift register sections 648, 650 and 653 respectively. The digits of the multiplicand beginning with the lowest order are transferred to shift register sections 643, 637 and 631 respectively. The partial product of the lowest order multiplier with the second lowest order multiplicand is formed in partial product generator 601. The partial product formed in partial product generator 602 is transferred to shift register section 611.

At time T4, the middle and high order digits of the multiplier are transferred to shift register sections 651 and 654 respectively. The digits of the multiplicand beginning with the lowest order are transferred to shift register sections 644, 638 and 632 respectively. The lowest order digit $P2^0$ of the product uniquely comprises the single partial product contained in shift register section 611 and now is transferred to shift register section 658. The partial product of the middle digit of the multiplier and the lowest order digit of the multiplicand is formed in product generator 605. The partial product formed by the lowest order digit of the multiplier with the highest order digit of the multiplicand is formed in partial product generator 600. The partial product formed in product generator 601 is transferred to shift register section 610.

At time T5, the lowest order digit $P2^0$ of the product is transferred to shift register section 659, the highest order digit of the multiplier is transferred to shift register section 655, and the middle digit of the multiplier is transferred to shift register section 652. The digits of the multiplicand starting with the lowest order are transferred to shift register sections 645, 639 and 633 respectively. The partial product between the middle order digit of the multiplicand and the middle order digit of the multiplier is formed in partial product generator 604. The addition circuit 614 forms the sum of the partial product formed in product generator 605 and the partial product held in shift register section 610. The shift register section 609 receives the partial product generated in partial product generator 600.

At time T6, the lowest order digit $P2^0$ of the product appears at the output terminal 626. The second lowest order digit $P2^1$ of the product has been formed in addition circuit 614 and is transferred to shift register section 660. The highest order digit of the multiplier is transferred to shift register section 656, and the two highest orders of the multiplicand are transferred to shift register sections 640 and 634 respectively. Addition circuit 613 receives the partial product stored in shift register section 609 and the partial product formed in generator 604 along with the carry from addition circuit 614. Partial product generator 608 forms the partial product between the highest order digit of the multiplier and the lowest order digit of the multiplicand. Partial product generator 603 forms the partial product between the middle order digit of the multiplier and the highest order digit of the multiplicand.

At time T7, the second lowest order digit $P2^1$ of the product appears at terminal 627 and the highest order digits of the multiplier and the multiplicand are transferred to shift register sections 657 and 635 respectively. The partial product between the highest order digit of the multiplier and the middle order digit of the multiplicand is formed in the partial product generator 607. Addition circuit 617 receives the partial product from the partial product generator 608, and the sum from the addition circuit 613. Addition circuit 612 receives the partial product formed in partial product generator 603, and the carry generated by the addition circuit 613.

At time T8, the third order digit $P2^2$ of the product appears at terminal 628, and the product formed by the two highest order digits of the multiplier and the multiplicand is formed in partial product generator 606. Shift register section 619 receives the carry from addition circuit 612; addition circuit 616 receives the partial product generated in 607, the sum formed in addition circuit 612, and the carry generated in addition circuit 617.

At time T9, the next highest order digit $P2^3$ of the product appears at terminal 629. Addition circuit 615 sums the product produced by partial product generator 606, the carries stored in shift register section 619, and the carry generated by addition circuit 616.

Finally, at T10, the highest order digit $P2^4$ of the product appears at terminal 630. (The purpose of shift register section 672 and terminal 673 is discussed hereinafter.)

At any one time complete information about two numbers and its product in various stages of computation is contained in a single horizontal line or level. Thus, the multiplying circuit is not being used for that particular set of numbers in any other level. Therefore, other levels of the multiplier may be used to produce other products. Thus it may be seen that if level T5 is being used in the sixth stage of multiplying a first set of numbers, the components lying along level T4 may be occupied in the fifth stage of multiplying a second set of numbers, and the components lying along level T3 may be occupied in the fourth step of multiplying still a third set of numbers.

In this manner it is possible for all stages of the multiplier to be full of information bits comprising various stages of multiplication of various sets of numbers. In the multiplier illustrated, since there are horizontal groups or levels corresponding to 11 intervals of time, 11 different sets of numbers may be stored in the various stages of the multiplier in various conditions of operation. It may be also observed that in succeeding intervals of time, for instance, succeeding digits corresponding to the lowest order digit of a product will appear at output terminal 626 every succeeding interval of time. Moreover, in a given time interval, the third digit of a first product will appear at terminal 628 simultaneously with the appearance of the second digit of a second product at terminal 627, and the first digit of a third product appearing at terminal 626. For this reason we say that the digits of a particular product are skewed in time, and the digits of the multipliers and the multiplicands entered into the input terminals should also be skewed in time.

It was stated above that the reasons for shift register sections 658, 659 and 660 on levels T4, T5 and T6 would be explained later. It may be observed that the lowest order digit $P2^0$ of the product appears in shift register section 611 two time intervals earlier than the second lowest order digit $P2^1$ is formed in addition circuit 614, but that the next to the highest order digit $P2^3$ is formed in addition circuit 616 only one interval of time before the highest order digit $P2^4$ is formed in addition circuit 615. Thus the skewing of the lower order digits of the product is different from the skewing of the higher order digits. The inclusion of shift register sections 658, 659 and 660 delays the delivery of the lowest order digits so that the skewing of all the digits of the product is the same. That is, each digit appears only one time interval ahead of the hest higher order digit.

The digits of the product may be deskewed by the addition of extra shift register sections to the appropriate output terminals. If one additional shift register section is connected between addition circuit 616 and terminal 629; two additional shift register sections connected between addition circuit 617 and terminal 628; three additional shift register sections between shift register section 660 and terminal 627; and four additional shift register sections connected between shift register section 659 and terminal 626 — then the product will be deskewed and appear in parallel form.

Similar additional shift register sections may be connected to the input terminals if the numbers to be multiplied are only available in parallel form and therefore require skewing.

Figure 7:
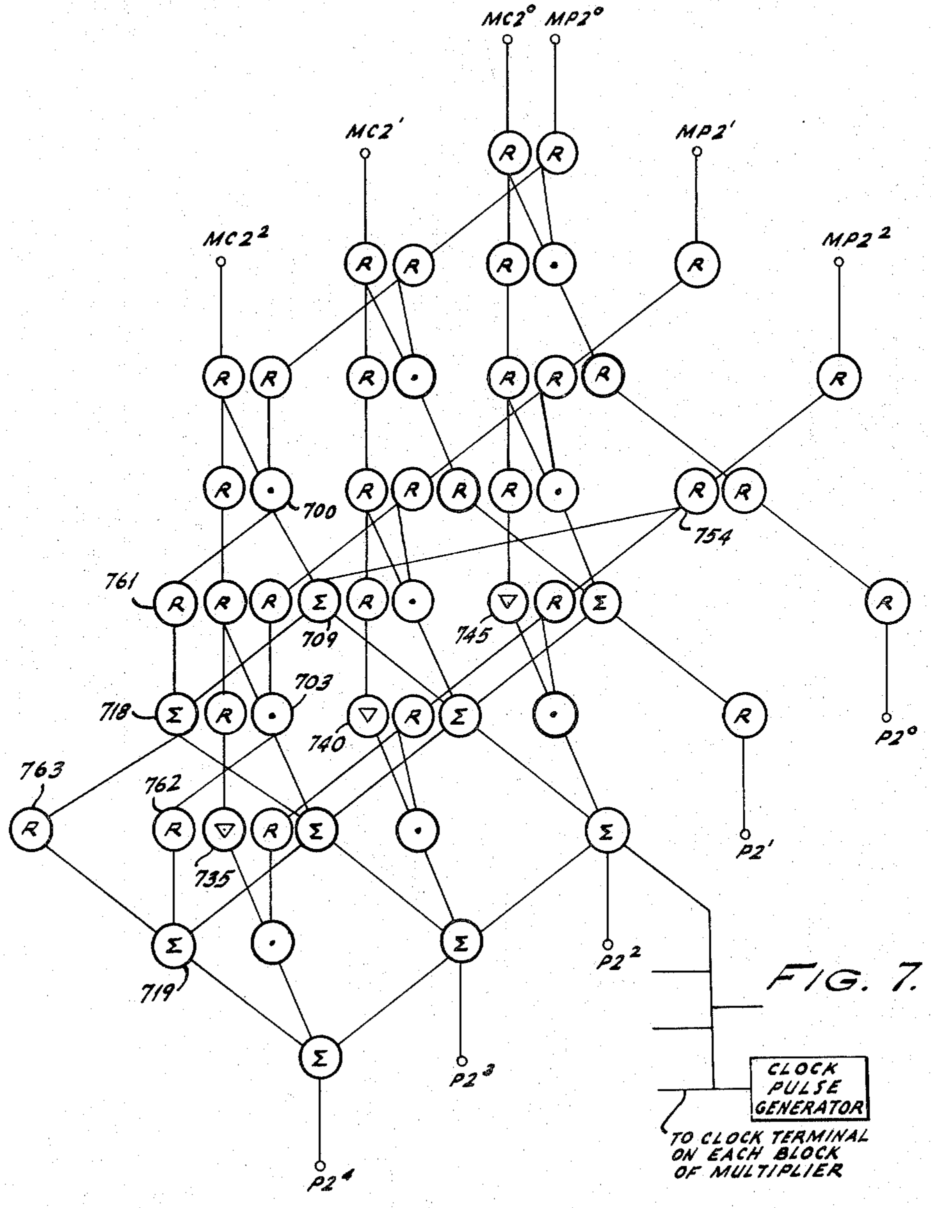
FIG. 7 shows an alternate embodiment of the multiplier unit of FIG. 6 for handling negative numbers.

The multiplier circuit illustrated in FIG. 6 is useful for multiplying only positive numbers. In certain types of multiplying operations, particularly those used for Fourier analysis or transform work where one of the multiplying numbers represents sine and cosine functions, the numbers change from positive to negative and back to positive in a set of numbers. In order to avoid the need for complicated logic networks to account for the change in sign, two's complement arithmetic is often resorted to. FIG. 7 shows a multiplier similar to FIG. 6 with changes made so that it can operate in two's complement arithmetic. Two's complement multiplication is described starting on page 161 of the textbook referred to above under "Background."

There are four differences between FIG. 7 and FIG. 6. First, the three shift register sections 735, 740 and 745 are now inverter type shift register sections, as shown in FIG. 1(*b*) and FIG. 3. Second, shift register section 609 is now addition circuit 709, and a connection is made between shift register section 754 and addition circuit 709 for transferring the highest order digit of the multiplier to the addition circuit attached to product generator 700 which forms the product between the lowest order multiplier with the highest order multiplicand. Third, shift register section 619 in FIG. 6 is now changed to addition circuit 719, and shift register section 672 and terminal 673 are removed. Fourth, addition circuit 718 and shift register sections 761, 762 and 763 are added. Register 761 stores the output of product generator 700 for one clock cycle and passes it to an input of addition circuit 718 for addition to any carries generated in addition circuit 709. Similarly, shift register sections 762 and 763 store the outputs of product generator 703 and addition circuit 718 respectively for one clock pulse cycle and pass them to the inputs of addition circuit 719.

The purpose of the first two changes is to enable the multiplier to handle negative multipliers, and the purpose of the last two changes is to enable the multiplier to handle negative multiplicands.

To simplify the discussion of the structural transition from the embodiment shown in FIG. 6 to the embodiment shown in FIG. 7, the embodiment of FIG. 6 has been discussed heretofore as comprising only output terminals 626 to 630 inclusive, at which appear the successive digits of a five-digit product. It is possible, however, to form a six digit product from two three-digit binary numbers. Therefore, if the multiplier of FIG. 6 is to be enabled to product a six-digit product, a carry output terminal will have to be provided on addition circuit 615, a $P2^5$ output terminal 673 will have to be provided and a shift register section 672 will have to be provided to transfer any carries generated in addition circuit 615 to the extra output terminal 673 one clock pulse interval later (i.e., at time T11) In contrast, in the embodiment of FIG. 7, the five product digit terminals $P2^0$ through $P2^4$ inclusive are sufficient since one digit of each number in two's complement is used for sign information and therefore the product of two three-digit two's complement numbers need never exceed five digits.

Although multipliers for three-digit by three-digit numbers are shown in FIGS. 6 and 7, it is obvious that the principle disclosed may be extended in known manner to any number of digits in either the multiplier or the multiplicand, or both. Typically, eight-digit and 16-digit multipliers are not uncommon. The above described circuits are particularly useful in computers for forming the Fourier transform, or computing a Fourier analysis of a wave form, and a vocoder work. The subject multiplier is particularly useful in the apparatus disclosed in pending application of John L. Robinson and R. F. Munnich, bearing Ser. No. 103,503, filed Jan. 4, 1971, now U.S. Pat. No. 3,706,929, assigned to the assignee of the present application.

There is an alternate method of changing some of the blocks in FIG. 6 to permit two's complement multiplication. Shift register sections 648, 652, 645, 635, 657 and 640 are changed to inverter type registers. Shift register section 609 is changed to an addition circuit with one of the inputs connected to the output of product generator 600 and the other input connected to the output of shift register section 632. The carries input is connected to the output of shift register section 654. The carries output is connected to an extra shift register section in time line T6 and thence to the second input of addition circuit 612. The sum output is connected to one of the inputs of addition circuit 613.

On page 162 of the text book referred to above under "Background" there are two methods of performing multiplication using negative numbers in the multiplicand. This alternate embodiment uses the first method described whereas FIG. 7 uses the second method described.

I claim:

1. A binary multiplier circuit for multiplying together a multiplier and a multiplicand, the respective digits of each of said multiplier and said multiplicand being represented by respective signals supplied at respectively different input terminals at respectively different times, the signal representative of the lowest order one of said digits in each of said multiplier and multiplicand being supplied at the earliest of said different times and the signals respectively representative of the successively higher-order ones of said digits being supplied at successively later times, adjacent ones of said different times being separated by one time unit, said circuit comprising:

*a.* first means for supplying each of said multiplier-digit-representative signals at each of a first number of specified successive times, said first number being equal to the number of digits in said multiplicand, and adjacent ones of said specified successive times being spaced by said one time unit;

*b.* second means for supplying each of said multiplicand-digit-representative signals at each of a second number of given successive times, said second number being equal to the number of digits in said multiplier, and adjacent ones of said given successive times being spaced by two of said time units;

c. a row of partial product generators for each digit of said multiplier, each row having an order corresponding to the order of the corresponding digit of said multiplier, each of said rows of partial product generators having a number of partial product generators equal to the number of digits in said multiplicand, each partial product generator in each of said rows having a position in that row corresponding to the order of the corresponding digit of said multiplicand, each of said partial product generators having means for receiving a first input and a second input and for producing an output;

*d.* means coupled to said first means, for supplying, at successive times separated by one of said time units, that one of said signals which is representative of a digit of given order of said multiplier, to said first input of successive ones of said partial product generators located in that row of partial product generators corresponding to said given order;

*e.* means coupled to said second means, for supplying, at successive times separated by two of said time units, that one of said signals which is representative of a digit of specified order of said multiplicand, to said second input of successive ones of said partial product generators located, in said rows of partial product generators, in respective positions corresponding to said specified order;

*f.* a plurality of ordered rows of addition circuit arranged so that the lowest order row of addition circuits corresponds to the second lowest order digit of said multiplier, there being one less row of addition circuits than there are rows of partial product generators, each addition circuit in each of said rows of addition circuits having a position in that row corresponding to the order of the corresponding digit of said multiplicand, each of said addition circuits having means for receiving a first input and for providing a sum output and a carry output, each of said addition circuits except the highest order addition circuit in said lowest order row of addition circuits having means for receiving a second input, and each of said addition circuits except the addition circuit in the lowest-order position in each row of addition circuits having means for receiving a carry input;

*g.* each of said addition circuits except the addition circuit in the lowest-order position in each of said rows of addition circuits being connected to receive a carry input from the addition circuit in the next-lower order position in said row, means for supplying to addition circuits in said lowest order row of addition circuits, as said second input, the outputs of the partial product generators of respectively corresponding position in the second lowest order row of partial product generators, and means for supplying to each addition circuit in said lowest order row of addition circuits except the addition circuit in the highest-order position in that row, as said first input, the output of the partial product generator in the next-higher-order position in the lowest order row of partial product generators; each of said addition circuits in the remaining rows of addition circuits corresponding to the third and higher order digits of said multiplier being connected to receive as a first input the output of the partial product generator in the same position in the same order row of partial product generators; all addition circuits except the addition circuit in the highest order position in each of said remaining rows of addition circuits being connected to receive as a second input the sum output of the addition circuit in the next-higher-order position in the next lower order row of addition circuits; and the order addition circuit in the highest-order position in each of the said remaining rows of addition circuits being connected to receive as a second input the carry output of the addition circuit in the highest-order position in the previous row of addition circuits;

*h.* and a plurality of output terminals, the highest order output terminal being connected to the carry output of the addition circuit in the highest-order position in the highest order row of addition circuits, each of said sum outputs of each of said addition circuits in the highest order row of addition circuits being connected to a corresponding one of said output terminals, each of said sum outputs of the addition circuits in the respective lowest-order positions in the lower order rows of addition circuits being connected to a corresponding one of said output terminals, and the lowest order output terminal being connected to the output of the partial product generator in the lowest-order position in the lowest order row of the partial product generators.

2. A binary multiplier circuit as defined in claim 1 wherein said first means and said second means respectively comprise first and second sets of shift registers.

3. A binary multiplier circuit as defined in claim 2 wherein said first set of shift registers comprises a shift register for each digit in said multiplier, each shift register in said first set of shift registers having as many sections as the sum of (a) the number of digits in said multiplicand and (b) the power of two corresponding to the order of said multiplier digit which is spaced in time by said shift register; and said second set of shift registers comprises a shift register for each digit of said multiplicand, each shift register in said second set of shift registers having as many sections as one less than twice the number of digits in said multiplier.

4. A binary multiplier circuit as defined in claim 1 wherein each said partial product generator and each said addition circuit includes storage means for holding the outputs generated by said generator and said addition circuit, respectively, for at least one of said time units.

5. A binary multiplier circuit as defined in claim 4 wherein said first means and said second means respectively comprise first and second sets of shift registers.

6. A binary multiplier circuit as defined in claim 5 wherein said first set of shift registers comprises a shift register for each digit in said multiplier, each shift register in said first set of shift registers having as many sections as the sum of (*a*) the number of digits in said multiplicand and (*b*) the power of two corresponding to the order of said multiplier digit which is spaced in time by said shift register; and said second set of shift registers comprises a shift register for each digit of said multiplicand, each shift register in said second set of shift registers having as many sections as one less than twice the number of digits in said multiplier.

7. In a binary multiplier circuit for multiplying together a multiplier and a multiplicand, each of said multiplier and multiplicand having at least a first digit and a second digit, said second digit being of the next higher order than said first digit, said digits of each of said multiplier and said multiplicand being represented by respective signals supplied at respectively different terminals at respectively different times, said signals representative of the higher order one of said digits in each of said multiplier and multiplicand being supplied one time unit later than said signals representative of the lower order one of said digits said multiplier and multiplicand, respectively, the combination comprising:

*a.* first means for supplying said signal representative of said first digit of said multiplier at a first time, and also at a second time spaced one time unit from said first time;

*b.* second means for supplying said signal representative of said second digit of said multiplier at a third time and also at a fourth time said third time being spaced by said one time unit from said second time, and said fourth time being spaced by said one time unit from said third time;

*c.* third means for supplying said signal representative of said first digit of said multiplicand at said first time and also at said third time;

*d.* fourth means for supplying said signal representative of said second digit of said multiplicand at said second time and also at said fourth time;

*e.* a first row and a second row of partial product generators, each of said rows of partial product generators comprising a first partial product generator and a second partial product generator, each of said partial product generators having means for receiving a first input signal and a second input signal and for producing an output signal;

*f.* means coupling said first means to the respective first inputs of said partial product generators in said first row, for supplying said signal representative of said first multiplier digit, at said first time to said first partial product generator in said first row, and at said second time to said second partial product generator in said first row; means coupling said second means to the respective first inputs of said partial product generators in said second row, for supplying said signal representative of said second multiplier digit, at said third time to said first product generator in said second row, and at said fourth time to said second product generator in said second row; means coupling said third means to the respective second inputs of said first partial product generators in said first row and said second row, for supplying said signal representative of said first multiplicand digit, at said first time to said first partial product generator in said first row, and at said third time to said first partial product generator in said second row; and means coupling said fourth means to the respective second inputs of said second partial product generators in said first row and said second row, for supplying said signal representative of said second multiplicand digits, at said second time to said second partial product generator in said first row, and at said fourth time to said second partial product generator in said second row;

*g.* a first addition circuit having at least a first input, a second input, a sum output, and a carry output;

*h.* a second addition circuit having at least a first input, a carry input, a carry output and a sum output;

*i.* means for connecting said first inputs of said first addition circuit and said second addition circuit respectively to said outputs of said first partial product generator and said second partial product generator in said second row respectively, and for connecting said second input of said first addition circuit to said output of said second partial product generator in said first row, and means for connecting the carry output of said first addition circuit to said carry input of said second addition circuit;

*j.* first, second, third, and fourth conductors;

*k.* means for connecting said first conductors to said output of said first partial product generator in said first row, means for connecting said second conductor and said third conductor to said sum outputs of said first addition circuit and said second addition circuit respectively, and means for connecting said fourth conductor to said carry output of said second addition circuit.

8. A binary multiplier circuit according to claim 7, wherein said means for connecting said second input of said first addition circuit to said output of said second partial product generator in said first row comprises a third addition circuit having an input connected to said output of the last-named partial product generator and a sum output connected to said second input of said first addition circuit.

9. A binary multiplier circuit according to claim 8, wherein said third means for supplying at said third time said signal representative of said first multiplicand digit comprises means for inverting said signal representative of said first multiplicand digit and for supplying said inverted signal at said third time; and said fourth means for supplying at said fourth time said signal representative of said second multiplicand digit comprises means for inverting said signal representative of said second multiplicand digit and supplying the latter inverted signal at said fourth time.

* * * * *